June 17, 1930.　　J. S. TOOHEY ET AL　　1,765,316
METAL SAWING MACHINE
Filed Sept. 1, 1926　　3 Sheets-Sheet 3
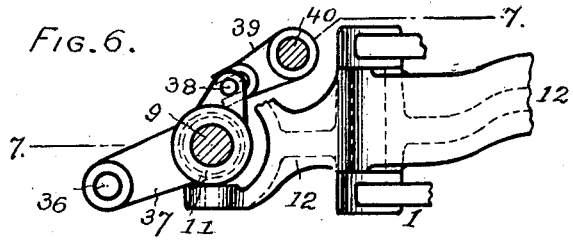
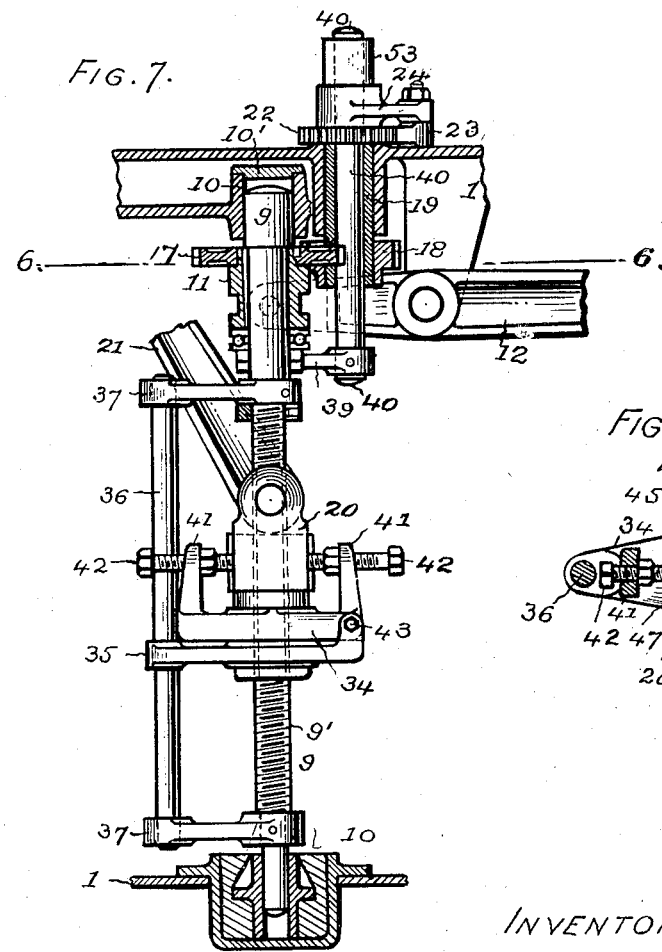
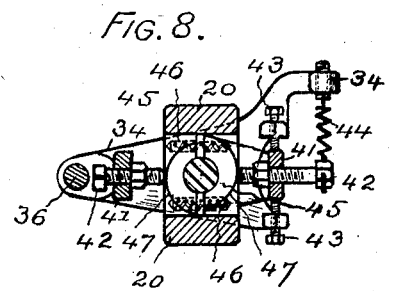
INVENTORS:
JOHN S. TOOHEY AND
MALCOLM E. ERSKINE,
by Robert Burns,
ATT'Y.

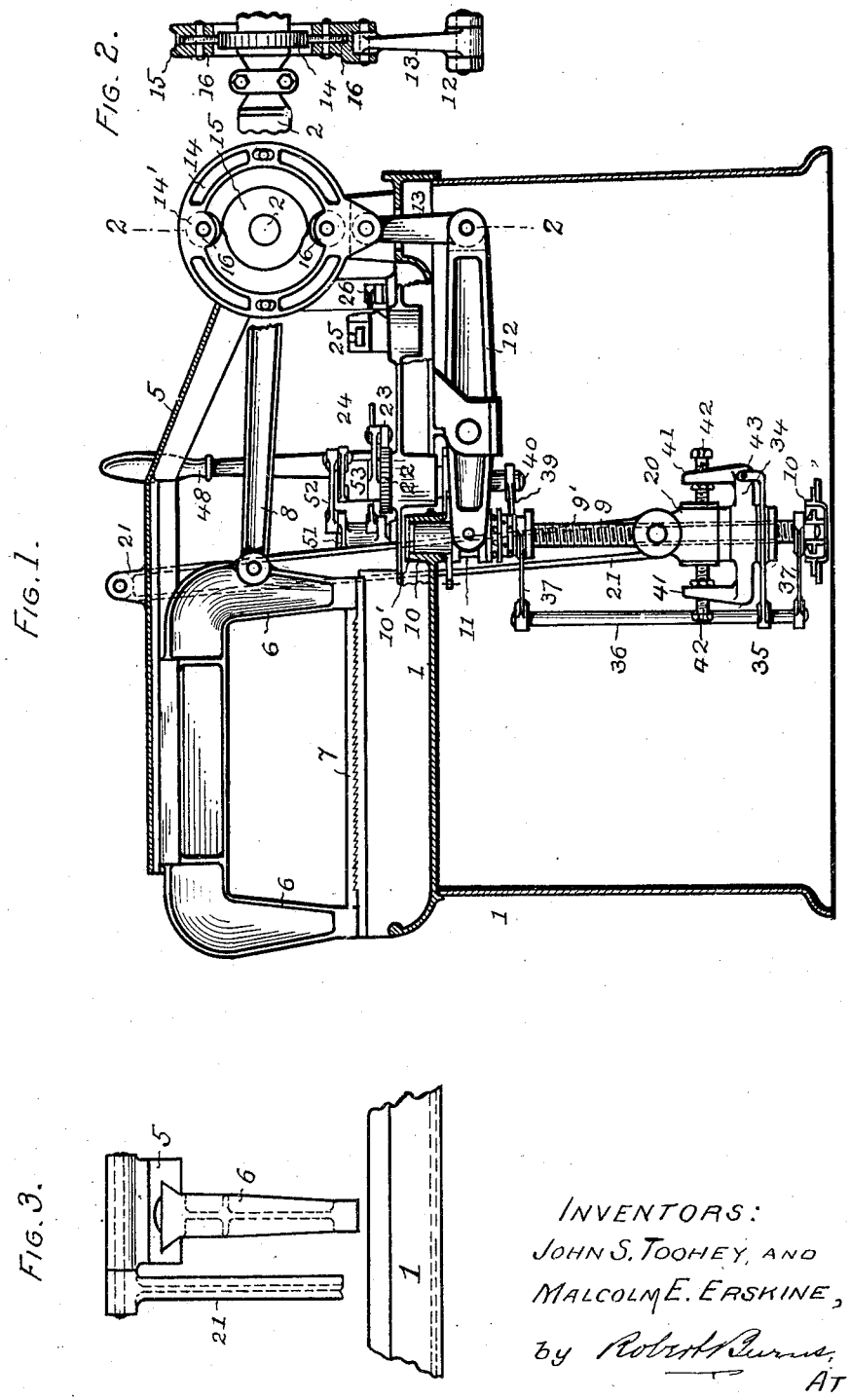

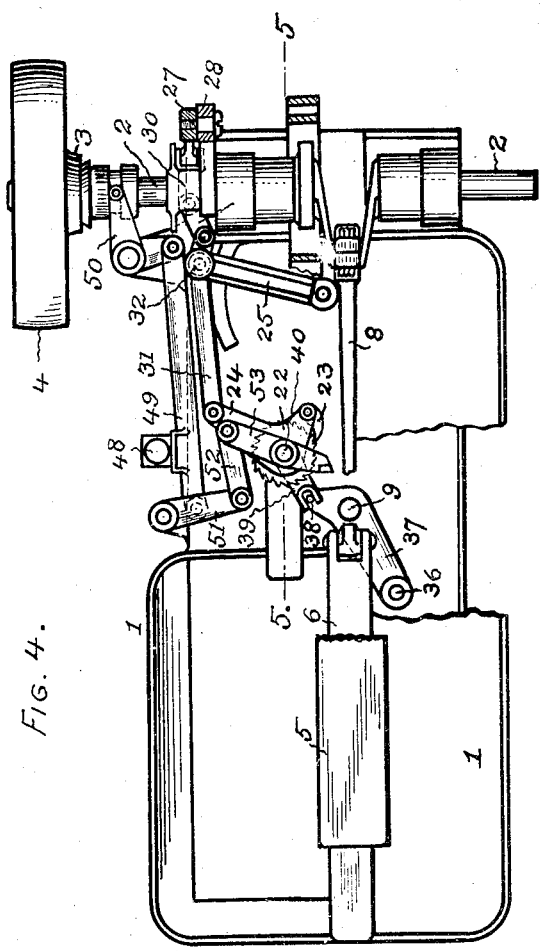
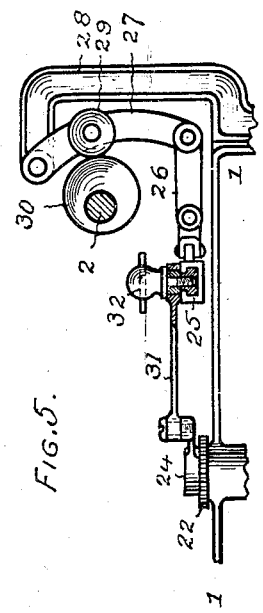

Patented June 17, 1930

1,765,316

UNITED STATES PATENT OFFICE

JOHN S. TOOHEY AND MALCOLM E. ERSKINE, OF RACINE, WISCONSIN, ASSIGNORS TO RACINE TOOL & MACHINE COMPANY, OF RACINE, WISCONSIN, A CORPORATION OF WISCONSIN

METAL-SAWING MACHINE

Application filed September 1, 1926. Serial No. 132,968.

This invention relates to metal sawing machines of the hack saw type, in which the saw carrying yoke receives reciprocation in an approximately horizontal direction, with said yoke with the frame on which it is guided pivotally mounted on the machine frame so as to be capable of a swinging movement in a vertical direction and permit the downward movement of the saw blade as the sawing operation progresses, as well as an upward movement of the saw carrying yoke and its guide frame, out of the way, with a completion of one sawing operation, and a subsequent resetting of the parts for a succeeding operation. And the present improvement has for its objects:—

To provide a commercially practical structural formation and combination of parts, whereby the saw blade is positively fed into the work during the entire active or cutting stroke of the saw blade, with the construction admitting of the automatic raising of the saw blade clear of such work during the return or inactive stroke of the saw blade.

To provide a structural formation and association of parts and mechanisms whereby the automatic and positive feeding means of the saw blade is released from its active condition with the completion of a sawing operation, or at a desired intermediate point in said active operation, to attain a convenient and rapid lifting of the saw blade, its carrying yoke, etc. to a starting position in a succeeding operation of the machine, the construction providing in addition coacting means whereby a clutch on the driving shaft of the machine is operated in unison with said controlling means, to stop and start the rotation of the machine, in the successive manual operation of said controlling means, all as will hereinafter more fully appear.

In the accompanying drawings:—

Fig. 1, is a side elevation of a sawing machine having the present invention applied, the hollow base or support being shown in section.

Fig. 2, is a detail section on line 2—2, Fig. 1, of the eccentric mechanism by which automatic rise and fall movement is imparted to the saw carrying yoke in each cycle of operations of the machine.

Fig. 3, is a detail end elevation of the saw carrying yoke and the vertically swinging guide frame upon which said yoke has movement.

Fig. 4, is a top view of the machine, with parts of the base broken away.

Fig. 5, is a detail sectional elevation on line 5—5, Fig. 4, of the operating mechanism by which the positive downward feeding means of the saw blade is operated by unison with the other mechanisms of the machine.

Fig. 6, is a detail horizontal section on line 6—6, Fig. 7, of the positive saw feed mechanisms of this invention.

Fig. 7, is a detail vertical section of the same on line 7—7, Fig. 6.

Fig. 8, is a detail horizontal section of the same, on line 8—8, Fig. 7.

Like reference numerals indicate like parts in the several views.

The invention is shown in the drawings as applied to the extensively used type of hack saw machines, in which a main base 1 usually of a hollow shell form, carries at one end fixed bearing blocks for the driving crank shaft 2 of the machine, with said shaft having clutch connection 3 with a driving pulley 4 having connection with a suitable power source. Such older structure comprising in addition, a swinging guide frame 5 pivotally mounted on the driving shaft 2, to swing in a vertical plane and formed with a guideway for a U shaped yoke member 6 in the depending end arms of which the hack saw blade 7 is secured, with said yoke member receiving movement in an approximately horizontal plane and in a transverse direction to a piece of metal held in a suitable holding vise, fixed on the base of the machine, through a pitman connection 8 with the crank arm of the driving shaft 2. In the described construction the guide frame 5 receives a rise and a fall movement in each revolution of the mechanism, so that in the return stroke or movement of the hack saw blade 7 and its carrying yoke member 6, the same will be raised out of cutting engagement with the material operated on, while in the active or cutting stroke of the saw and frame, the same will be lowered into proper cutting engagement with such material.

The described raising and lowering movements of the saw and frame in each cycle of operations of the machine are preferably attained in a positive manner by a detail construction and arrangement of parts hereinafter described.

A material feature of the present invention involves means for effecting a positive feed of the hack saw blade to the work, during the entire active or cutting strokes of said saw blade, with such means preferably comprising a part of the mechanism by which the above mentioned raising and lowering movements of the saw blade is attained, and to such end the detail construction and arrangement of parts as follows, is employed.

A cylindrical shaft or stem 9, which in the preferred construction shown, is mounted for vertical movement in upper and lower guide boxes 10, fixedly secured to the main base 1, and adapted to permit a limited rise and fall of the stem 9, as well as an intermittent turning movement of the same, and in the construction shown the upper end of the upper guide block is closed by a detachable cap 10' to prevent entrance of foreign matter to the bearing surface of the parts.

Near its upper end the shaft or stem 9 carries a fixed sleeve or collar 11, formed with a peripheral groove or channel for operative engagement with the yoke shaped end of a lever 12 pivoted on the main housing 1 of the machine. The other end of the lever 12 has connection by a link 13 with the cam yoke 14 of a cam disk 15 that is fixed on the driving shaft 2 of the machine, so that with each revolution of said shaft, limited up and down movement is imparted, in a positive manner, to the vertical shaft or stem 9 and the parts operatively associated therewith.

In the preferred construction shown, the main portion of the cam yoke 14 is of an annular shape and is provided with diametrically opposed and inwardly extending ears 14' between which are journalled bearing rollers 16 in bearing contact with the perimeter of the cam disk 15, such construction is adapted to afford a compact and substantial means for attaining the required positive and intermittent movements of the lever 12 and parts operatively connected therewith.

Fixedly associated with the upper part of the aforesaid sleeve or collar 11 of the stem or shaft 9, is a gear wheel 17 that has operative engagement with a companion gear wheel 18 carried by a tubular countershaft 19 journalled in the main base 1, with the gear wheel 18 having a greater thickness than the gear wheel 17, in order that said gear wheel 17 may have the required up and down movements without becoming disengaged from the gear wheel 18.

Below the aforesaid sleeve or collar 11 of the stem or shaft 9, the said stem or shaft is formed with a screw-threaded portion 9' for operative engagement, in the disconnectible manner hereinafter described, with a guide block or head 20, which in turn has operative connection by one or more links 21 with the guide frame 5 aforesaid, to impart the described positive up and down movement to the saw blade, at the same time that said block or head 20 is intermittently moved downward by a feed mechanism as follows:

The tubular countershaft 19 above described carries at its upper end a fixed ratchet wheel 22, the operating pawl or dog 23 is pivotally mounted in a frame 24 that in turn is pivotally mounted on said countershaft 19, in order that with a rocking movement of the frame 24, an intermittent positive rotation will be imparted to the ratchet wheel 22, and through the described intermediate parts to the stem or shaft 9 aforesaid.

In the preferred construction shown in Figs. 1, 4 and 5, the extent of the rocking movement of the aforesaid frame 24 is varied to attain a corresponding variation in the degree or extent of the movement in the present intermittent feed mechanism, by a detail construction and combination of parts as follows:—

A radius bar 25, preferably of the T slot type is pivoted at one end on the main base 1, and receives oscillating movement through a connecting link 26, attached to the lower end of a pendant rocker bar 27, the upper end of which is pivoted on an overhanging bracket piece 28 on the man base 1, with said bar 27 carrying a bearing roller 29 at its mid-length in operative engagement with an eccentric 30 on the driving shaft 2 of the machine.

Intermediate of the rocker frame 24 and the radius bar 25 is a connecting link 31, one end of which is pivotally connected to the rocker frame 24, while the other end of said link 31 is adjustably connected to the radius bar 25 by a screw clamp 32, adapted for adjustable engagement in the T slot of said radius bar, and when clamped in place is adapted to provide the required degree of stroke or feed of the associated parts.

The guide block or head 20, above referred to, is orificed and encircles the vertical shaft or stem 9, aforesaid, and is formed with a transversely extending rectangular opening adapted to receive and slidingly guide the hereinafter described split nut members 45 by which disconnectible engagement between the head 20 and the screw threaded portion 9' of the vertical shaft or stem 9 is attained in the present mechanism, and in which any turning movement of the block or head 20 is prevented by the attachment thereto of the connecting links 21 heretofore described.

Associated in a rotatable manner with the guide block or head 20, aforesaid, and in encircling relation to the vertical shaft or stem 9, is an oscillatory support 34, of a detail construction as follows:

At one side the frame 34 is formed with a lateral arm 35 having sliding engagement on the vertical guide stem or rod 36 of a yoke frame, that comprises in addition to said stem 36, upper and lower horizontal arms 37 which are pivotally mounted on the vertical shaft or stem 9, in a manner to prevent independent vertical movement between said arms and said shaft.

In the construction shown, the upper one of the arms 37 is formed with an extension having at its outer end a pin or stud 38 for operative engagement with the forked end of a rock arm 39 carried on the lower end of a stem or arbor 40, journalled in the bore of the aforesaid tubular countershaft 19. The stem or arbor 40 is adapted for manual actuation by means hereinafter described, to impart turning movement in a horizontal plane to the aforesaid yoke frame 36, 37, and to the oscillatory support 34 associated therewith.

Upon the aforesaid oscillatory support 34 are a pair of upstanding lugs 41, screw-threaded for the reception of a pair of adjustable abutment screws 42, that are arranged in aligned relation at opposite sides of the vertical shaft or stem 9 and the associated split nut structure hereinafter described, and in the preferred construction shown in Figs. 7 and 8, the oscillatory support 34 is composed of upper and lower members, having limited turning adjustment to each other and in a horizontal plane by means of transverse adjusting screws 43, mounted on one member and having bearing engagement preferably against one of the lugs 41 aforesaid on the other member. In cases where only one adjusting screw 43 is employed, a tension spring 44 forms a resilient connection between the frame members to effect a movement between said members in a direction contrary to that attained by the single adjusting screw 43. In the described construction of the oscillatory support 34, one member thereof will have sliding engagement with the aforesaid rod 36 of the operating yoke frame, while the other member will carry the adjustable abutment screws 42, as shown, and with a view to a proper assembly adjustment of the parts.

The split or separable nut provision heretofore referred to, consists of a pair of counterpart screw-threaded half nuts or blocks 45, the screw threads of which are adapted to engage the screw-threaded portion 9' of the vertical shaft or stem 9, aforesaid. The opposed ends of each of the half nuts or blocks 45 are parallel to each other and fit and slide in the opening of the aforesaid head or block 20.

Interposed between the half nuts or blocks 45, are a plurality of springs 46, the tendency of which is to force said half nuts or blocks apart and out of operative engagement with the screw-threaded portion of the vertical shaft or stem 9. And for the purpose of effecting a positive engagement of the screw threads of the half nuts 45, with the screw threads 9' of the vertical shaft 9, the outer sides 47 of said half nuts has eccentric formations as shown that provide bearings for the upper ends of the aforesaid abutment screws 42, so that with an active movement in a horizontal plane, said screws 42 will press against the eccentric sides 47 of the half nuts to force the same into operative engagement with the screw threads of the vertical shaft or stem 9.

In the present improvement manually operated means are employed for effecting the engagement and release of the split nut construction above described, with and from the operating shaft or stem 9, and at the same time afford a like control of the clutch connection 3 between the power pulley 4 and the driving shaft 2 of the machine, such means comprising a detail construction and arrangement of parts as follows:

A vertically arranged hand lever 48 is pivoted at its lower end on the main base 1 and intermediate its length has operative connection with a horizontal link 49 which at one end is connected to a bell crank lever 50 also pivoted on the main base 1, and operatively connected to the movable part of the clutch mechanism 3, between the power pulley 4 and the driving shaft 2 of the machine.

At the other end the horizontal link 49 is connected to the mid-length of a horizontal rock arm 51, also pivoted on the main base 1, with the free end of said rock arm connected by an intermediate link 52 with a rock arm 53 fixedly secured to the upper end of the stem or arbor 40 heretofore described, and by means of which motion is imparted to the opening and closing means of the split nut mechanism above described.

With this construction the throwing in of the clutch by the movement of the lever 48 causes the saw frame 6 and the saw 7 to reciprocate back and forth in the usual manner and at the same time oscillates the support, including the parts 36, 37, 35 and 34, thereby causing the abutment screws 42 to act upon the split nut members 45 to move them to operative position relative to the screw-feed shaft 9 and during the cutting stroke of the saw, which in the present instance is its movement toward the shaft 2, the cam or eccentric 22 swings the lever outwardly and through the link 26, bar 25, link 31, rocker frame 24 to swing the pawl 23 and turn ratchet wheel 22 and thereby turn the feed-screw 9 through the gearing connections between it and the shaft 41, thereby causing a positive downward feed of the saw during its cutting stroke. On the return stroke of the saw the cam 15 acts through yoke 14, link 13 and lever 12 to raise the feed-screw shaft 9 and with it the saw and saw frame through the connection of said saw frame by the links 21, blocks 20 and nut members 45 with said shaft.

Having thus fully described our invention, what we claim and desire to secure by Letters Patent, is:—

1. In combination a metal sawing machine, a saw blade, a movable supporting means for said saw blade, means for imparting reciprocation to the saw blade in relation to said supporting means, means for imparting continuous and unyielding downward movement to said supporting means and saw blade during the entire cutting stroke of the saw blade, the same comprising a screw shaft, manually adjustable automatic means for imparting intermittent rotation to said screw shaft, a head encircling said screw shaft, a pair of split nut members associated with said head and having eccentrically formed outer sides, an oscillatory support associated with the screw shaft, opposed members on said support in engagement with the eccentric sides of said nut members, manual means for imparting movement to said oscillatory support, and a link connection extending from said head to the aforesaid supporting means.

2. In combination in a metal sawing machine, a saw blade, a movable supporting means for said saw blade, means for imparting reciprocation to the saw blade in relation to said supporting means, means for imparting continuous and unyielding downward movement to said supporting means and saw blade during the entire cutting stroke of the saw blade, the same comprising a screw shaft, manually adjustable automatic means for imparting intermittent rotation to said screw shaft, a head encircling said screw shaft, a pair of split nut members slidable in said head and having eccentrically formed outer sides, a plurality of springs tending to force said nut members apart, an oscillatory support associated with the screw shaft, opposed members on said support in engagement with the eccentric sides of said nut members, manual means for imparting movement to said oscillatory support, and a link connection extending from said head to the aforesaid supporting means.

3. In combination in a metal sawing machine, a saw blade, a movable supporting means for said saw blade, means for imparting reciprocation to the saw blade in relation to said supporting means, means for imparting continuous and unyielding downward movement to said supporting means and saw blade during the entire cutting stroke of the saw blade, the same comprising a screw shaft, manually adjustable automatic means for imparting intermittent rotation to said screw shaft, a head encircling said screw shaft, a pair of split nut members slidable in said head and having eccentrically formed outer sides, an oscillatory support encircling the screw shaft, opposed abutment screws on said support in abutting engagement with the eccentric sides of said nut members, manual means for imparting movement to said oscillatory support, and a link connection extending from said head to the aforesaid supporting means, the oscillatory support comprising two portions having independent turning adjustment in relation one to the other, one portion carrying the abutment screws aforesaid, means carried by the other portion for effecting adjustment between the portions, and manual means connected to the last mentioned portion for imparting movement to the oscillatory support as a whole.

4. In combination in a metal sawing machine, a saw blade, a movable supporting means for said saw blade, means for imparting reciprocation to the saw blade in relation to said supporting means, means for imparting positive feed movement to said supporting means and saw blade during the entire cutting stroke of the saw blade, the same comprising a screw shaft, automatic means for imparting intermittent rotation to said screw shaft, a head carrying a screw nut structure having detachable operative engagement with said screw shaft, a link connection extending from said head to said supporting means, and means for imparting limited intermittent rise and fall to the saw blade in each cycle of operations, the same comprising a lever one end of which is operatively connected to said screw shaft, a power shaft, a cam on said power shaft, a cam yoke engaging said cam, and a link connecting said cam yoke with the other end of said lever, the cam yoke having an annular shape with inturned ears in diametrically opposed relation with bearing rollers mounted in said ears.

5. In combination in a metal sawing machine, a saw blade, a movable supporting means for said saw blade, means for imparting reciprocation to the saw blade in relation to said supporting means, means for imparting positive feed movement to said supporting means and saw blade during the entire cutting stroke of the saw blade, the same comprising a screw shaft, a gear wheel fixed on said screw shaft, a second gear wheel carried by a tubular countershaft, a ratchet wheel on said tubular countershaft, a ratchet dog operatively engaging said ratchet wheel, and receiving movement from a moving element of the machine, a head, a screw nut structure associated with said head and having detachable operative engagement with said screw shaft, and a link connection extending from said head to said supporting means.

6. In combination in a metal sawing machine, a saw blade, a movable supporting means for said saw blade, means for imparting reciprocation to the saw blade in relation to said supporting means, means for imparting positive feed movement to said supporting means and saw blade during the entire cutting stroke of the saw blade, the same comprising a screw shaft, a gear wheel fixed on said screw shaft, a second gear wheel carried by a tubular countershaft, a ratchet wheel on said tubular countershaft, a ratchet dog operatively engaging said ratchet wheel, and receiving movement from a moving element of the machine, a head, a screw nut structure associated with said head and having detachable operative engagement with said screw shaft, a link connection extending from said head to said supporting means, and a manually actuated means for effecting engagement and disengagement of said nut structure with and from said screw shaft.

7. In combination in a metal sawing machine, a saw blade, a movable supporting means for said saw blade, means for imparting reciprocation to the saw blade in relation to said supporting means, means for imparting positive movement to said supporting means and saw blade during the entire cutting stroke of the saw blade, the same comprising a screw shaft, automatic means for imparting intermittent rotation to said screw shaft, a head encircling said screw shaft, a pair of split nut members associated with said head and having eccentrically formed outer sides, an oscillatory support associated with the screw shaft, opposed members on said support in engagement with the eccentric sides of said nut members, a yoke frame carried by the screw shaft and having a guide stem in guiding engagement with said oscillatory support, manual means for imparting movement to the oscillatory support through said yoke frame, and a link connection extending from said head to the aforesaid supporting means.

8. In combination in a metal sawing machine, a saw blade, a movable supporting means for said saw blade, means for imparting reciprocation to the saw blade in relation to said supporting means, means for imparting positive movement to said supporting means and saw blade during the entire cutting stroke of the saw blade, the same comprising a screw shaft, automatic means for imparting intermittent rotation to said screw shaft, a head encircling said screw shaft, a pair of split nut members associated with said head and having eccentrically formed outer sides, an oscillatory support encircling the screw shaft, opposed members on said support in engagement with the eccentric sides of said nut members, a yoke frame carried by the screw shaft and having a guide stem in guiding engagement with said oscillatory support, a link connection extending from said head to the aforesaid supporting means, an arm on said yoke frame, a countershaft carrying at one end an arm operatively connected to the arm of the yoke frame, and at the other end connection with an operating handle.

9. In combination in a metal sawing machine, a saw blade, a movable supporting means for said saw blade, means for imparting reciprocation to the saw blade in relation to said supporting means, means for imparting positive feed movement to said supporting means and saw blade during the entire cutting stroke of the saw blade, the same comprising a screw shaft, a gear wheel fixed on said screw shaft, a second gear wheel carried by a tubular countershaft, a ratchet wheel on said tubular countershaft, a ratchet dog operatively engaging said ratchet wheel, and receiving movement from a moving element of the machine, a head, a screw nut structure associated with said head and having detachable operative engagement with said screw shaft, an oscillatory support associated with said screw shaft, a link connection extending from said head to said supporting means, a yoke frame carried by the screw shaft and having a guide stem engaging the oscillatory support, and manual means for imparting movement to the oscillatory support through said yoke frame.

10. In combination in a metal sawing machine, a saw blade, a movable supporting means for said saw blade, means for imparting reciprocation to the saw blade in relation to said supporting means, means for imparting positive feed movement to said supporting means and saw blade during the entire cutting stroke of the saw blade, the same comprising a screw shaft, a gear wheel fixed on said screw shaft, a second gear wheel carried by a tubular countershaft, a ratchet wheel on said tubular countershaft, a ratchet dog operatively engaging said ratchet wheel, and receiving movement from a moving element of the machine, a head, a screw nut structure associated with said head and having detachable operative engagement with said screw shaft, a link connection extending from said head to said supporting means, an oscillatory support associated with said screw shaft, a yoke frame carried by the screw shaft and having a guide stem engaging said oscillatory support, an arm on said yoke frame, a central countershaft journalled in the aforesaid tubular shaft and carrying at one end an arm operatively connected to the arm of said yoke frame, and an operating handle operatively connected to the other end of said central countershaft.

11. In combination in a metal sawing machine, a saw blade, a movable supporting means for said saw blade, means for imparting reciprocation to the saw blade in relation to said supporting means, means for imparting positive feed movement to said supporting means and saw blade during the entire cutting stroke of the saw blade, the same comprising a screw shaft, a gear wheel fixed on said screw shaft, a second gear wheel carried by a tubular countershaft, a ratchet wheel on said tubular countershaft, a ratchet dog operatively engaging said ratchet wheel, and receiving movement from a moving element of the machine, a head, a screw nut structure associated with said head and having detachable operative engagement with said screw shaft, a link connection extending from said head to said supporting means, an oscillatory support associated with said screw shaft, a yoke frame carried by the screw shaft and having a guide stem engaging said oscillatory support, an arm on said yoke frame, a central countershaft journalled in the aforesaid tubular shaft and carrying at one end an arm operatively connected to the arm of the yoke frame, an operating handle having operative connection with the other end of said central countershaft, a driving shaft, a power pulley, a clutch between the power pulley and driving shaft, means for operating said clutch, and a common connection between the clutch operating means and the aforesaid operating means of the yoke frame.

12. In a metal sawing machine, the combination with a saw blade and its frame and means for moving the same including a drive shaft and a clutch for connecting said shaft with a source of power, of means for positively feeding the saw to its work during its cutting stroke comprising a screw shaft and a split nut engageable with the shaft and operatively connected to said frame, clutch shifting means, and means controlled by said clutch shifting means for controlling the engagement and disengagement of said split nut.

13. In a metal sawing machine, the combination with a saw and its frame and means for reciprocating the same, of positive feed means for the saw comprising a screw shaft, a split nut on said shaft operatively connected to said saw frame, and an oscillatory means provided with parts engageable with the medial portions of the members forming the split nut to move them to operative position, and means for turning said screw shaft during the cutting stroke of the saw.

14. In a metal sawing machine, the combination with a saw and its frame and means for reciprocating the same, of positive feed means for the saw comprising a screw shaft, a split nut on said shaft operatively connected to said saw frame, the sections of said nut having oppositely disposed cam surfaces and oscillatory means engageable with said cam surfaces to move said sections into engagement with said shaft.

Signed at Racine, Wisconsin, this 31st day of August, 1926.

JOHN S. TOOHEY.
MALCOLM E. ERSKINE.